(12) United States Patent
Cash, Jr.

(10) Patent No.: US 6,379,164 B1
(45) Date of Patent: Apr. 30, 2002

(54) SYSTEM AND METHOD FOR CONFIGURING ELECTRICAL RECEPTACLES

(76) Inventor: Ronald G. Cash, Jr., 12117 W. Cooper Dr., Littleton, CO (US) 80127

( * ) Notice: Subject to any disclaimer, the term of this patent is extended or adjusted under 35 U.S.C. 154(b) by 0 days.

(21) Appl. No.: 09/643,013

(22) Filed: Aug. 21, 2000

Related U.S. Application Data

(63) Continuation-in-part of application No. 09/566,858, filed on May 8, 2000.

(51) Int. Cl.[7] ......................... H01R 4/66; H01R 13/648
(52) U.S. Cl. ........................................ 439/106; 439/650
(58) Field of Search .............................. 439/106, 107, 439/76.2, 650, 658, 216; 315/292; 340/310.01; 307/40

(56) References Cited

U.S. PATENT DOCUMENTS

| | | | | |
|---|---|---|---|---|
| 1,481,278 A | | 1/1924 | Wood ........................ 137/607 |
| 3,500,130 A | | 3/1970 | Aument et al. ............. 361/731 |
| 3,510,822 A | | 5/1970 | Patterson .................... 439/107 |
| 3,715,627 A | | 2/1973 | D'Ausilio ................... 317/99 |
| 4,245,880 A | | 1/1981 | Zimmerman et al. ....... 439/405 |
| 4,418,333 A | * | 11/1983 | Schwarzbach et al. ...... 340/310 |
| 4,820,197 A | | 4/1989 | Stumpff et al. ............. 439/535 |
| 4,958,048 A | | 9/1990 | Bell ............................. 174/53 |
| 5,207,599 A | | 5/1993 | Chung ......................... 439/650 |
| 5,357,170 A | | 10/1994 | Luchaco et al. ............. 315/159 |
| 5,406,176 A | | 4/1995 | Sugden ........................ 315/292 |
| 5,420,482 A | | 5/1995 | Phares ......................... 315/292 |
| 5,450,334 A | * | 9/1995 | Pulizzi et al. ............... 364/492 |
| 5,471,012 A | | 11/1995 | Opel ............................. 174/53 |
| 5,595,491 A | | 1/1997 | May ............................ 439/106 |
| 5,621,282 A | | 4/1997 | Haskell ....................... 315/324 |
| 5,735,710 A | | 4/1998 | Blaauboer et al. .......... 439/535 |
| 5,762,525 A | | 6/1998 | Candeloro ................... 439/660 |
| 5,848,915 A | | 12/1998 | Canizales .................... 439/650 |
| 5,973,414 A | * | 10/1999 | Baberg ........................ 307/116 |
| 6,112,127 A | * | 8/2000 | Bennett ....................... 700/86 |
| 6,144,291 A | * | 11/2000 | Odinak et al. ......... 340/310.01 |
| 6,175,201 B1 | | 1/2001 | Sid ............................. 315/312 |
| 6,201,187 B1 | | 3/2001 | Burbine ...................... 174/60 |
| 6,202,017 B1 | * | 3/2001 | Bleckmann et al. .......... 701/70 |

* cited by examiner

Primary Examiner—Brian Sircus
Assistant Examiner—Hae Moon Hyeon
(74) Attorney, Agent, or Firm—Rader, Fishman & Grauer PLLC; Lee G. Meyer

(57) ABSTRACT

A wiring system for providing electrical service to a structure allows all electrical service ports to be wired in series. The electrical service ports consist of a junction box in electrical communication with a receptacle. The functionality of the receptacle is determined solely by a processor, which is preconfigured (i.e., preset or preprogrammed) to determine the functionality of that specific electric receptacle. Thus any receptacle, in electrical communication with any junction box in the wiring system, where the junction boxes are wired in series, could be a switch, a switched outlet, a switched light or the like without the necessity of wiring a particular junction box in a manner to provide that receptacle's functionality.

37 Claims, 4 Drawing Sheets

SYSTEM AND METHOD FOR CONFIGURING ELECTRICAL RECEPTACLES

The present application is a Continuation-in-Part of U.S. application Ser. No. 09/566,858 filed May 8, 2000, for an Improved Electrical Junction Box.

BACKGROUND OF THE INVENTION

1. Field of the Invention

That application related to residential and commercial electrical wiring systems and receptacles; and, more particularly, to an improved electrical junction box for electrically connecting an electrical receptacle to an electrical wiring system. The present invention relates to residential and commercial electrical wiring systems; and, more particularly, to an improved electricrification system and method for electrically wiring a building or similar structure.

2. Description of Related Art

State and federal building codes require that when a building is wired to provide electrical power therein, the wiring must be installed between the exterior and interior wall surfaces, beneath the floors, above the ceilings, between the surfaces of interior walls, or within some other rigid enclosure. The electrical wiring is installed after the framing of the building is completed but before the walls are erected on either side of the frame. Where ever electrical outlets, ceiling fixtures, wall switches, or the like are desired within the building, an electrical junction box, usually made of plastic or similar non-conductive material, is mounted on a frame member and then connected to the wiring. When wall surfaces, such as drywall or plaster, are later installed, access to the junction boxes is achieved through appropriate openings cut into the wall surface.

Thus, standard residential and commercial electrical systems comprise a plurality of electrical junction boxes, each of which provides electrical conduit for connecting the wires of electrical receptacles, such as an electrical outlets, switches, or fixtures, to the electrical wiring of the building. While conventional electrical systems and junction boxes function adequately and relatively safely, they admit a variety of interrelated limitations. Conventional electrical wiring requires a junction box to connect a building's electrical wires to a particular electrical receptacle by terminating the stripped wires at the receptacle itself. Therefore, in order to complete the proper, flush-mounted wall installation of any electrical receptacle, all of the many wires and connectors associated with connecting the particular receptacle to the electrical system must first be connected electrically to the receptacle and then the receptacle with the attached wires is inserted back into the box. If the power is not shut off while the electrical receptacle is being connected to the electrical system, the installer may receive an electrical shock during the installation, since the junction box contains a plurality of open wires and wire connections that are easily accessible and therefore readily mis-connected by the novice installer, such as the homeowner attempting to install a simple light fixture or ceiling fan without the aid of a skilled electrician. Moreover, because the wires are usually crammed into the junction box very tightly, the wires are capable of short-circuiting and causing dangerous electrical fires.

Standard electrical practices create additional limitations associated with the fact that current electrical systems only permit switch control of fixtures and/or outlets when the particular fixtures and/or outlets are directly wired to the same junction box as the switch. In an effort to circumvent this disadvantage, multiple gang junction boxes have been developed for terminating several switches in a single location and thereby permitting comparatively convenient control of multiple fixtures or groups of fixtures. Further, since a building's electrical circuits cannot be tested fully until after the walls of a building are erected, electrical connectivity errors or problems related to proper switch control of particular outlets and fixtures are frequent, especially in the case of multi-way switches, where more than one switch controls a single fixture or group of fixtures. These errors are costly and time-consuming to correct, as they require that the relevant portion of the interior wall surface be removed and reconstructed after the electrical error has been found and repaired. Moreover, current electrical practices provide no standard system or method to permit monitoring, controlling, reconfiguring, or otherwise changing the functionality of a particular receptacle without either directly modifying the particular receptacle or otherwise acting upon a control (i.e., a switch or other control device implemented as a receptacle) that is dedicated to controlling or monitoring the particular receptacle(s) and that is directly wired thereto. There is no known method to monitor, control, or change the functionality of either a single electrical receptacle or a plurality of electrical receptacles connected to the electrical system of a building structure wherein the location and/or functionality of each monitored, controlled, monitoring, or controlling receptacle may be freely changed.

It therefore would be advantageous to have an electrical service port comprising an electrical junction box and an electrical receptacle that permits convenient and simplified installation and removal of electrical receptacles within the box. It also would be advantageous to have an electrical junction box wherein electrical wires from a building's electrical system terminate at a set of terminal strips and lugs in a secure area of the box rather than directly on an electrical receptacle connected to the junction box. It further would be advantageous to have a junction box that provides a pair of plug-and-play terminals into which electrical receptacles are readily and conveniently plugged for connection to a building's electrical system.

It would further be advantageous to have a means of communicating between the electrical receptacles within the electrical system, which means would not be affected by the opening or closing of a switch. It also would be beneficial to have an electrical system that provides the means to monitor, control or reconfigure individual electrical receptacles, within an electrical service port, connected to the system without regard to the location of the receptacles within the system. It also would be advantageous to have a wiring system that would enable changes to the location of a particular receptacle without affecting the receptacle's function or its ability to monitor, be monitored, control, or be controlled. It also would be advantageous to be able to change the function of a particular receptacle from another point in the system without physically operating directly upon or replacing the particular receptacle.

It also would be advantageous to have a junction box that provides a low voltage connector block adapted to provide for circuitry for an electrical communication path for controlling and or monitoring receptacle functionality. It also would be advantageous to have a electrical circuitry system wherein electrical receptacles having a built-in, internal logic system can be connected in any location within the system, and subsequently be moved, or reprogrammed, to any other location within the system, without affecting their ability to be controlled by any suitably configured switch or switch control in the building. It also would be advantageous to have a circuit system and wiring method that permits a single gang electrical junction box to accommodate a switch that is capable of controlling multiple electrical receptacles or groups of such receptacles. It further would be advantageous to have a circuit system that provides improved electrical junction boxes having a single connection or contact that permits communication, and thereby, control, monitoring, and/or reconfiguring of electrical receptacles connected to the system from any point within the system.

SUMMARY OF THE INVENTION

An electrical wiring system and method now have been discovered that overcome the above-described deficiencies of the prior art. According to the invention, a wiring system for providing electrical service to a structure allows all electrical service ports, comprising a junction box in electrical communication with a receptacle, regardless of their ultimate functionality, to be wired in series. The functionality of the receptacle, which electrically communicates with the junction box, is determined solely by a processor, which is preconfigured (i.e., preset or preprogrammed) to determine the functionality of that specific electric receptacle. Thus any receptacle, in electrical communication with any junction box in the wiring system, where the junction boxes are wired in series, could be a switch, a switched outlet, a switched light or the like without the necessity of wiring a particular junction box in a manner to provide that receptacle's functionality.

The present invention thus provides a building electrification system wherein the an electrical receptacle electrically communicates with an electrical junction, box wired in series to an electrified buss, provides an electrical service port, through which access to electrical service is provided such as by plugging in an appliance or another electrical device, or switching fixtures or appliances. In accordance with the instant invention an electrical service port comprises an electrical junction box, wired in series to an electrified buss, which determines the location of the port; and, an electrical receptacle, in electrical communication with the junction box, which provides the functionality of the electrical service port. All junction boxes are wired in a like fashion in series and the functionality of the electrical service port is determined by a programable receptacle, making all ports in the electrification system interchangeable, regardless of the functionality desired. Thus from a common buss the series wiring of the electrical junction boxes provides the electrical communication path between and among the electrical service ports.

Thus, electrical receptacles need not be fixedly located in relation to their corresponding switches or switch controls and the functionality of any receptacle can be changed at will. The circuitry of the present invention allows any junction box regardless of location in the system to contain a receptacle which can function as any component of a circuit. Thus switches can be changed from single to three way by merely changing the functionality of the receptacle in electrical communication with a junction box.

In accordance with one aspect of the invention the processor within the receptacle is preconfigured (i.e., pre-set or programmed prior to installation) requiring exchange of the entire receptacle within the junction box to change functionality of the electrical service port at the desired location. According to another aspect, the processors within the receptacle can be re-configured remotely, after installation, either by use of the house or building electrification circuitry or preferably by use of a low voltage independent controlling connections.

Thus, electrical receptacles, having a functionality, can be connected in any junction box location within the electrification system, and subsequently moved or re-configured, in place or to any location within the system. In accordance with the invention a single gang electrical junction box can have multiple functionality, such as the ability to control multiple electrical receptacles or groups of such receptacles from a single station.

In accordance with a preferred embodiment the system is able of multi-configurable functionality by use of a low voltage twisted pair actuating and/monitoring circuit that permits central control and monitoring of all such electrical service ports within the system. By providing each electrical junction box with a separate low voltage circuit connection that interfaces with an electrical receptacles connected to the junction box, the circuitry system of the present invention permits the flow of information between electrical service ports, and accordingly, the control and monitoring of that electrical receptacle within the electrical service ports. By eliminating the need of switches to open or close portions of the system in order to turn off the switched receptacle, the present invention enables continuity of the communication path between the receptacles of the system, thereby facilitating continuous control and monitoring of all receptacles connected to the system, regardless of their location.

Accordingly, individual receptacles may be relocated or reprogrammed within the system without loss of either functionality, monitorability, or controllability. In accordance with another aspect of the invention, the system enables use of re-configurable processors, having internal logic systems, that can control any and/or all electrical receptacles to change the functionality of any electrical service port in the system.

In accordance with the broad aspect of the invention, the electrical system of the instant invention comprises a plurality of electrical service ports having a plurality of electrical junction boxes wired in series to a buss, and at least one electrical receptacle in electrical communication with at least one of the electrical junction boxes. The electrical receptacle comprises a processor that is configured to provide the desired functionality to the receptacle, irrespective of its location in the system. Thus, the electrical receptacle of the instant invention comprises a processor that allows the electrical functionality of the receptacle to be determined irrespective of the location or wiring of the junction box with which it electrically communicates. In one aspect the processor is configurable, preferably remotely, and can provide information to and/ or receive information from other receptacles connected to the system. The processor can also enable the receptacle to be re-configured, monitored, or controlled by a suitable receptacle located elsewhere on the system. Alternatively, the receptacle can be configured to re-configure, control, and/ or monitor other receptacles on the system, and may perform combinations of these classes of functions.

In accordance with the present invention, the instant electrical wiring system can also employ an electrical junction box that permits electrical wires from a building's electrical system to terminate at a set of terminal strips and lugs in a secure area of the junction box rather than directly on an electrical receptacle that is mounted on and connected to the junction box. The improved electrical junction box provides a set of plug-and-play electrical terminals into which electrical receptacles plug directly without any need for relatively permanent wiring. Accordingly, electrical receptacles may be plugged directly into improved electrical junction boxes to form electrical service ports, and such receptacles easily may be relocated to form electrical service ports in any other location within the system.

In a preferred embodiment, the electrical junction box encloses a set of at least three conductive terminal strips, including at least one substantially electrically positive terminal strip, at least one substantially electrically negative terminal strip, and at least one substantially electrically neutral terminal strip. In this preferred aspect, the junction box also has a corresponding set of at least three female connecting lugs substantially aligned with and extending outwardly from the corresponding set of conductive terminal strips and adapted to removably matingly engage a corresponding set of at least three male connecting lugs on an electrical receptacle means.

Preferably, a security plate having apertures substantially corresponding to the female connecting lugs fits over the female connecting lugs for removable attachment within the interior of the housing means to provide a secure, substantially enclosed environment within the rear portion of the junction box. Thus all open electrical contacts within the junction box are separated from the remaining portion of the electrical junction box.

In accordance with another preferred aspect of the electrical junction box, a low voltage cable enters through an end panel of the housing means and terminates into a low voltage connector block, which is removably or fixedly attached to the housing means. A non-conductive low voltage barrier separates the low voltage connector block from the remainder of the junction box, thereby separating all standard voltage cables connected to the conductive terminal strips from the low voltage cables connected to the low voltage connector block. The low voltage connector block is adapted to terminate a low voltage cable and receive a control/monitor pigtail from an electrical receptacle mounted on and electrically connected to said electrical junction box, thereby providing a circuit for an electronic communication path. When a control or monitor able electrical receptacle, having a control/monitor pigtail is removably inserted into the junction box, the control/monitor pigtail removably interfaces with the low voltage connector block and completes the circuit. In a preferred embodiment, the low voltage connector block is enclosed behind the above-described security plate and is therefore contained within the rear portion of the junction box. In this preferred embodiment, the security plate further comprises at least one aperture that substantially corresponds to at least one aperture on the low voltage connector block that is adapted to receive the control/monitor pigtail. Thus, when the security plate encloses the low voltage connector block in a rear portion of the junction box, the control/monitor pigtail can removably and matingly engage the low voltage connector block through the security plate.

Other objects, features, and advantages of the present invention will become apparent to those skilled in the art from the following detailed description. It should be understood, however, that the detailed description and specific examples, while indicating preferred embodiments of the present invention, are given for purposes of illustration and not of limitation. Many changes and modifications within the scope of the present invention may be made without departing from the spirit thereof, and the invention includes all such modifications.

BRIEF DESCRIPTION OF PREFERRED EMBODIMENTS

The above and further objects of the invention will become more readily apparent as the invention is more fully understood from the detailed description to follow, with reference being made to the accompanying drawings in which like reference numerals represent like parts throughout and in which.

DETAILED DESCRIPTION OF PREFERRED EMBODIMENTS

Figure 1:
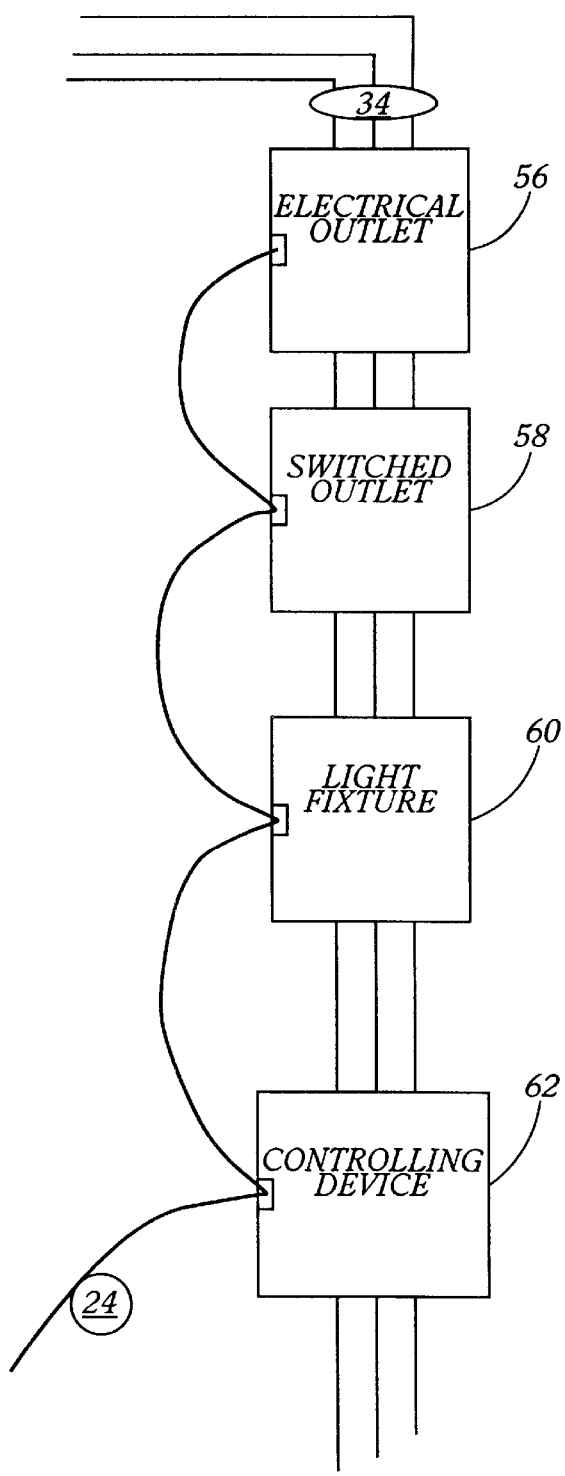
FIG. 1 is a high-level connectivity diagram showing a plurality of electrical service ports, having electrical junction boxes, wired in series each having a re-configurable receptacle.

This invention provides the ability to monitor, control, or change the functionality of an electrical service port by means of a processor communicating with either a single electrical receptacle or a plurality of electrical receptacles that communicate with the edifice wiring system through at least on electrified buss in series connection with junction boxes. Also, this system enables the location and/or functionality of each monitored, controlled, monitoring, or controlling receptacle to be changed at any time without rewiring. Because the system of the instant invention accomplishes switching, on or off, for example, within each individual receptacle, it is unnecessary to open the circuit as is required in a conventionally wired light circuit. As a result, the wiring of the instant system remains available for communication regardless of the on or off status of individual receptacles, and receptacles may communicate with other receptacles in the instant system by sending or receiving signals through the high voltage wiring. Alternatively, receptacles may employ additional low voltage control and monitoring wiring in communication with each electrical service port in addition to the high voltage cable.

The electrical junction boxes of the instant invention comprise housing means for enclosing the components of the electrical junction boxes and for fastening or attaching the electrical junction boxes to a building structure. Although conventional wiring junction boxes can be used in accordance with the instant invention, preferably the housing means encloses at least two conductive terminal strips that are insulated one from the other by a non-conductive barrier. Each conductive terminal strip has at least two terminal connecting lugs fixedly or removably attached in spaced apart relation along the conductive terminal strip. The terminal connecting lugs on the conductive terminal strips provide termination points for standard 600 V sheathed cable. A set of at least two female connecting lugs is substantially aligned with and extends outwardly from a corresponding set of at least two conductive terminal strips. The female connecting lugs provide a plug-and-play type interface that is adapted to matingly engage a corresponding set of at least two male connecting lugs on an electrical receptacle means for electrically connecting an electrical receptacle to said electrical junction box. The electrical receptacle means comprises a set of at least two male connecting lugs for removably inserting the electrical receptacle means into the corresponding female connecting lugs. In the case of a fixedly attached electrical device such as a light fixture or a ceiling fan, for example, the electrical device is wired to a receptacle adapter, and the set of at least two male connecting lugs on the receptacle adapter is removably inserted into the corresponding set of at least two female connecting lugs on the junction box. Thus, when the male connecting lugs of a receptacle or receptacle adapter on an electrical device are matingly engaged with or inserted into the female connecting lugs, the male connecting lugs are electrically connected to the set of conductive terminal strips in the junction box, thereby electrically connecting the receptacle or electrical device connected to a receptacle adapter to a building's electrical power supply.

Turning to FIG. 1, a high-level connectivity diagram shows a plurality of electrical receptacles wired in series in a single circuit. The circuit provides that all electrical service ports having junction boxes and receptacles are similarly wired. Receptacles are interchangeable and are therefore capable of being plugged into a junction box, regardless of the functionality of the receptacle. In a preferred embodiment, each identically wired electrical receptacle is removably inserted or plugged into its respective junction box, which is wired in series and connected to up to eight non-switch electrical receptacles on a single circuit.

As shown schematically in FIG. 1, examples of the variety of electrical receptacles that can be connected to the junction box and wired in series include electrical receptacle 56, which can be a standard electrical outlet; electrical receptacle 58, which can be a switched outlet; electrical receptacle 60 which can be adapted to accommodate a light fixture; and electrical receptacle 62 which can be a controlling receptacle, such as, for example, a touch pad that is configured to control both electrical receptacle 60 and electrical receptacle 58 individually or an electrical switch that is specifically configured to control electrical receptacle 58. The standard voltage cable 34 passes through each electrical receptacle in series, thereby providing electrical power to all receptacles 56, 58, 60, and 62 in series on the circuit. Specific control of the electrical power provided to each receptacle, such as whether the receptacle is turned on or off, is managed by each receptacle individually. If an electrical receptacle is a controllable receptacle, such as for example a switched outlet 58 or a light fixture 60, input from a controlling receptacle, such as for example touch pad or switch 62, is required to change the state (i.e., on/off stepped functionality, dim/bright ramped functionality, or intermittent/flash timed functionality) of the controllable receptacles 58 or 60. Controlling receptacles, such as touch pad or switch 62, are not hardwired directly to the receptacles they control, and control is not dependent upon determining whether or not a complete electrical circuit is connected to the receptacle being controlled.

Figure 2:
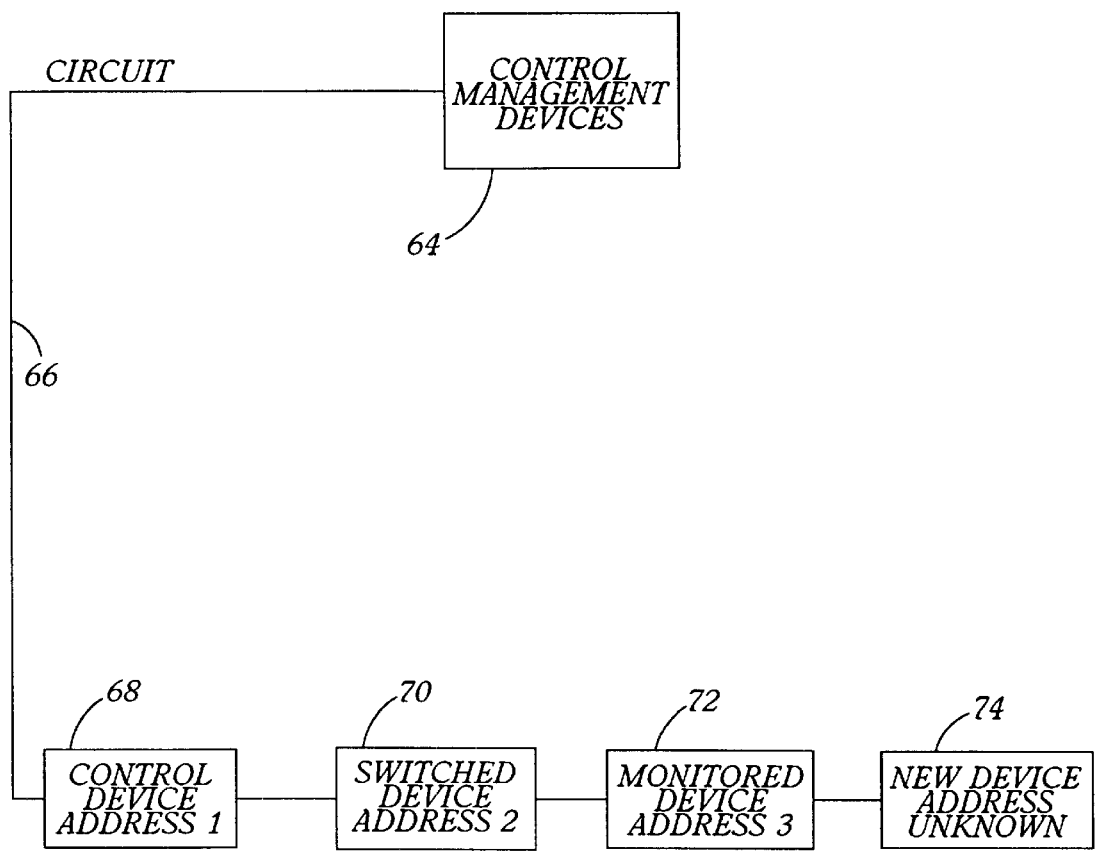
FIG. 2 is a flow diagram showing how both controlling and controlled receptacles communicate through the circuitry of the instant invention.

The system of the present invention employs a circuit that provides a communications path between and among all electrical receptacles, including outlets, switches, controls, sensors, detectors, fixtures, appliances, and other electrical devices electrically connected to the system. The circuit of the instant invention is illustrated in FIG. 2, which is a high-level view of the manner in which the circuit 66 connects, in series, management receptacle 64 to controllable or monitored receptacles 68, 70, 72, 74. Management receptacle 64 and receptacles 68, 70, 72, and 74 are all connected to the system by being mounted on and connected to an improved, plug-and-play electrical junction box. When a device having an electrical receptacle means, as shown and described with reference to FIG. 1 above, is mounted on and connected to an improved junction box in accordance with the invention, it is also installed and connected to the circuit 66. Once a receptacle or receptacle means is connected to circuit 66, the system assigns that receptacle a unique address and determines whether it is a controlling, controllable, or monitored receptacle. The electrical receptacle means connected to the electrical device has its own internal logic. That internal logic allows the receptacle to control other receptacles, be controlled by other receptacles, and/or be monitored by other receptacles. When a new receptacle is added to the circuit 66 that new receptacle initially triggers an unknown address, and the system broadcasts that there is a new receptacle on the network that requires an address assignment. The management receptacle 64 then assigns the next available address in the series to the new receptacle, and the system thereafter defines the receptacle by a unique name and location. Control of a particular receptacle that is integrated into the system can be accomplished in a number of ways. For example, the management receptacle 64 can direct a receptacle, either at a user's request or automatically based on a series of events, to change its state (i.e., on/off stepped functionality, dim/bright ramped functionality, or intermittent/flash timed functionality). Also, control receptacle 68 can be configured to control either single or multiple controllable receptacles 70. The management receptacle 64 is also able to monitor any controllable, controlling, or monitored receptacle, which allows the management receptacle 64 to know a receptacle's current state and/or whether power is being consumed through the receptacle. As described below with reference to FIGS. 3 and 4, in this preferred embodiment, when a plurality of electrical junction boxes are wired in series, standard 600 V sheathed cable 34 enters the junction box 10 through an end panel 18 of the housing means 12, connects to the conductive terminal strips 28, and exits the junction box 10 through an opposing end panel 18 of the housing means 12 for continuation of the electrical circuit and connection to the next junction box 10 in the series. In another preferred aspect, as shown in FIG. 1, a low voltage cable 24 communicates with each receptacle in the series circuit. As described below, with reference to FIGS. 3 and 4, low voltage cable 24 enters the junction box 10 through an end panel 18 of the housing member 12, connects to the low voltage connector block 44, and exits the junction box 10 through the opposing end panel 18 of the housing member 12 for continuation of the circuit and connection to the next junction box in the series.

Figure 3:
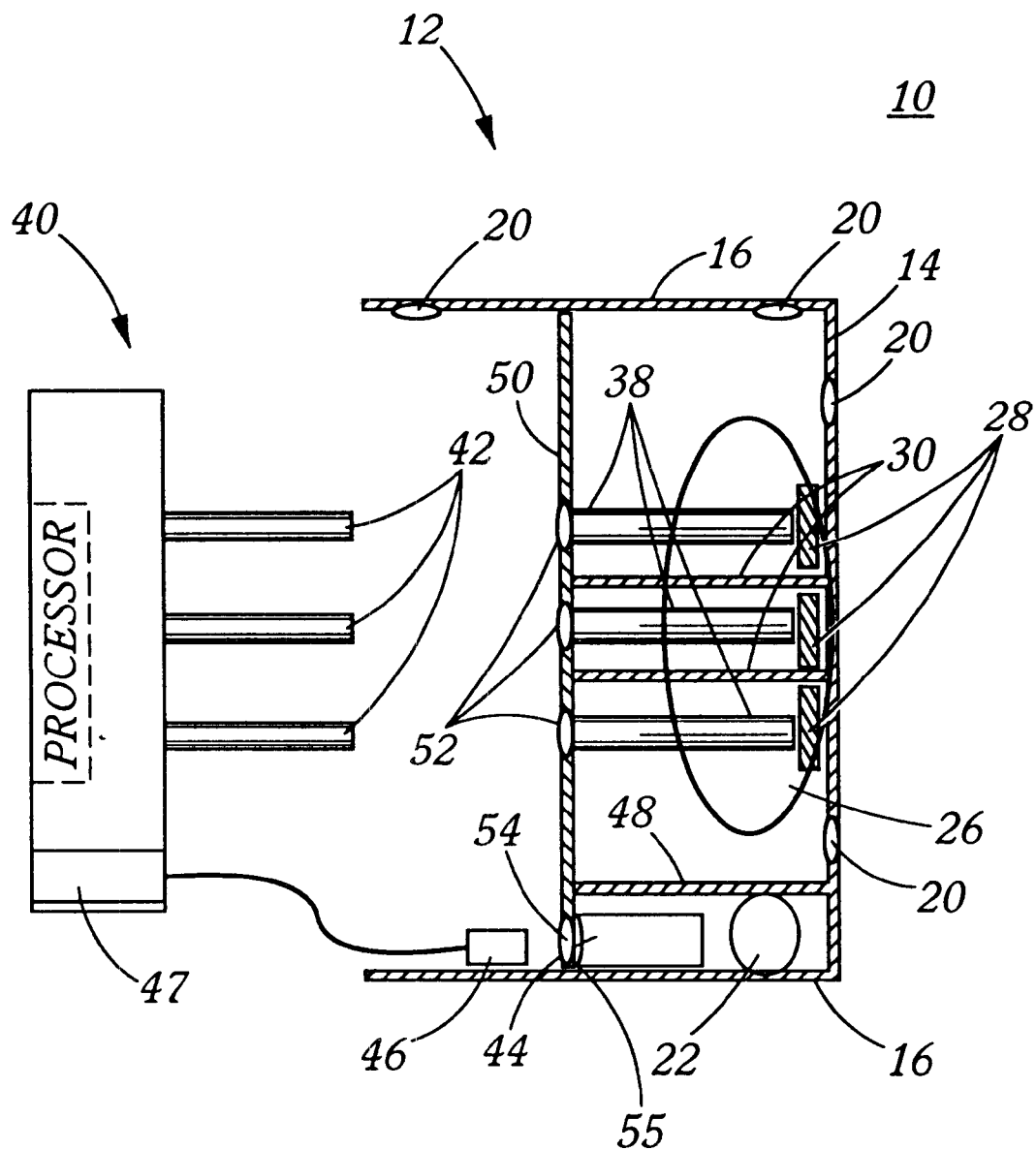
FIG. 3 is a cross-sectional top view of a preferred electrical junction box with plug in programable receptacle of the instant invention.
Figure 4:
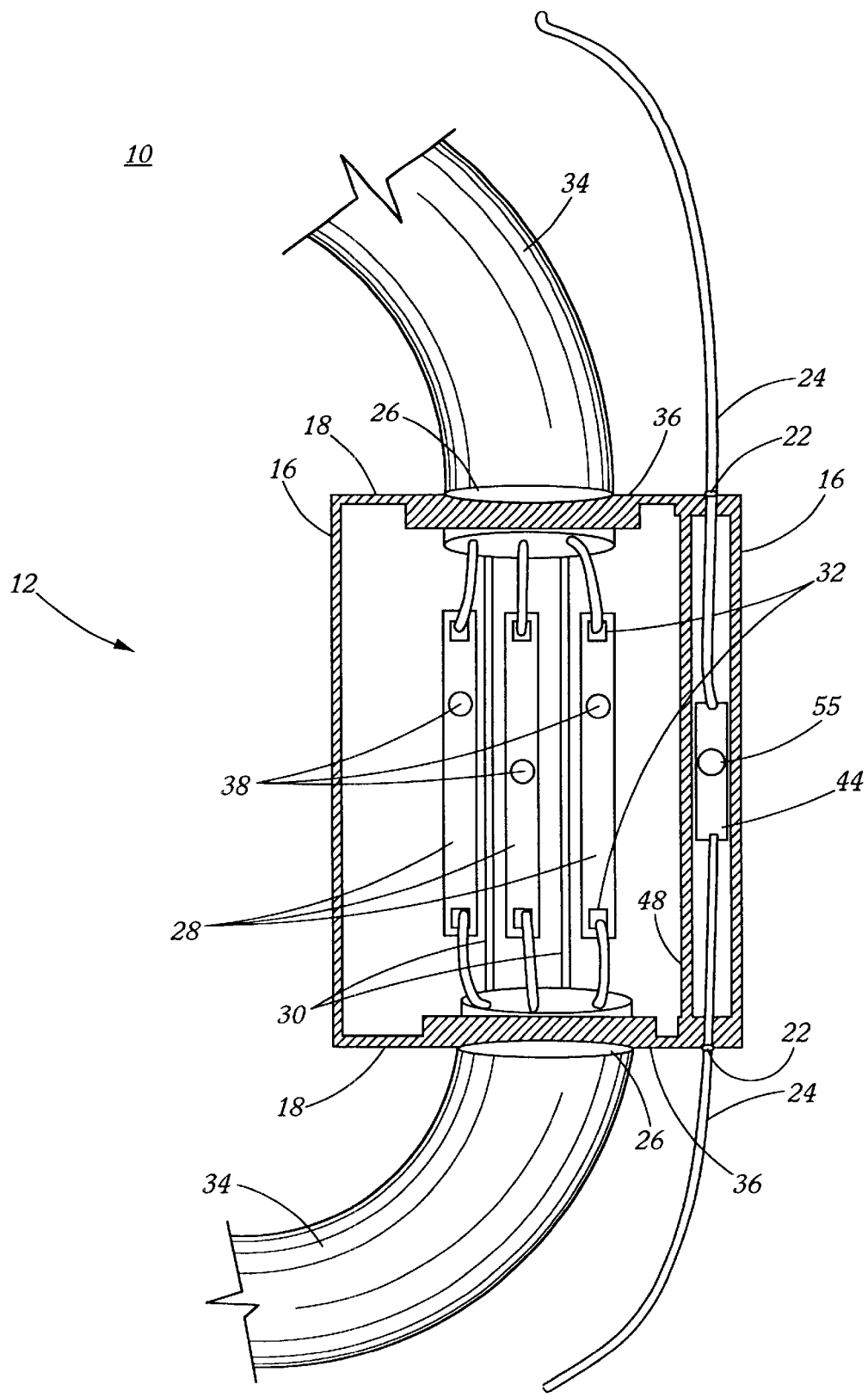
FIG. 4 is a frontal view of the preferred electrical junction box of the instant invention showing the wiring to the coaxial cable.

Turning now to FIGS. 3 and 4, the overall structure of the preferred electrical junction box 10 is illustrated. As shown in FIG. 3, the improved electrical junction box 10 comprises a housing or box member 12 which further comprises a rear panel 14 which can be square, rectangular, or any other suitable shape. A spaced, substantially parallel, opposed pair of side panels 16 extends outward from and substantially perpendicular to said rear panel 14, and a spaced, substantially parallel, opposed pair of end panels 18 extends outward from and substantially perpendicular to said rear panel 14 and bridges said side panels 16 to provide a partially enclosed space there between. There is at least one aperture or hole 20 in the rear panel 14 and/or in the side panels 16 adapted to receive fastener means for mounting the junction box 10 to a suitable surface of a building structure, such as a framing member or framing stud, for example. These apertures may be formed through the rear panel 14 and/or the side panels 16 or may be formed as key hole tabs that extend from the peripheral edges of the rear panel 14 and/or the side panels 16. In a preferred aspect, at least one electrical wire or cable aperture or opening 22 is formed through each of the end panels 18, preferably disposed toward the rear panel 14 and near or along one side of the housing or box member 12, and adapted to receive electrical wires or cables, such as, for example, low voltage cable 24. Cable is led into and exits the junction box 10 at cable entry apertures 26 which are disposed toward the center of both end panels 18 of the box member 12. The box member 12 of the electrical junction box 10 can be made of plastic or any other suitable, non-conductive material. The fastener means for mounting the junction box to a building surface structure are preferably screws but can be any suitable fastener known and practiced by one of ordinary skill in the art. The box member 12 of the instant junction box 10 contains a set of three conductive terminal strips 28 that are insulated one from the other by a non-conductive barrier 30. The non-conductive barrier 30 can be made of plastic or any other suitable material as known and practiced in the art. Each conductive terminal strip 28 further comprises a pair of terminal connecting lugs 32 fixedly attached in spaced apart relation along the conductive terminal strip 28, which provides for the termination of standard 600 V sheathed cable 34. Wire clamp means 36 adjacent the cable entry apertures 26 are fixedly attached to the end panels 18 for insuring that the standard 600V sheathed cable 34 is not inadvertently pulled out of the electrical junction box 10. A set of three female connecting lugs 38 provides a plug-and-play type interface to connect electrical receptacle means 40 to the conductive terminal strips 28 via male connecting lugs 42. The electrical receptacle means has a set of three male connecting lugs 42 for removably inserting the electrical receptacle means 40 into the corresponding female connecting lugs 38. The electrical receptacle means 40 can be, for example, an electrical outlet, a electrical switch, a switched electrical outlet, a fixture, an electrical appliance, or the like. In a preferred aspect of the instant electrical junction box 10, low voltage cable 24 enters the junction box 10 through electrical cable aperture 22 in end panel 18, terminates into low voltage connector block 44, and exits through cable aperture 22 in the opposing end panel 18 to provide a circuit for an electrical communications path. If electrical receptacle means 40 is control- or monitor-capable, low voltage connector block 44 is adapted to interface removably with or removably receive a control/monitor pigtail 46 on electrical receptacle means 40 to complete a circuit through low voltage cable 24. A low voltage pass through interface 47 connects the low voltage cable 24 to an electrical deice such as a computer (not shown). A non-coductive low voltage barrier 48 separates the low voltage connector block 44 from the remainder of the junction box 10, thereby separating all standard voltage cables 34 connected to the conductive terminal strips 28 from the low voltage cable 24 connected to the low voltage connector block 44. The non-conductive low voltage barrier 48 can be made of plastic or any other suitable material as known and practiced by one of ordinary skill in the art. A security plate 50, having apertures 52 corresponding to the female connecting lugs 38 and aperture 54 corresponding to an aperture or opening 55 in low voltage connector block 44, fits into the box member 12. The security plate 50 fits over, or in front of, the female connecting lugs 38 and the low voltage connector block 44 and removably attaches to the side panels 16 and end panels 18 of the housing means 12 to provide a secure, enclosed environment within the rear portion of the junction box 10 which thereby contains all open electrical contacts.

The plug-and-play features of the improved electrical junction box and the circuitry of the present system enable the system to be easily customized and modified without requiring either rewiring or that the user have extensive electrical knowledge. For example, if a room has a wall switch that is configured to control a particular electrical receptacle, such as, for example, a switched outlet or an electrical device attached to a receptacle or receptacle means, or the like, and the building's owner or user determines that the electrical receptacle would be more convenient if it were placed on another wall or in any other location within the improved wiring system, the improved electrical junction box and circuitry of the present invention permits the electrical receptacle to be unplugged from its original junction box and exchanged with the electrical receptacle at a second junction box. Unlike current electrical wiring practices, the building's owner or user does not have to hire an electrician to rewire the room. The switch control logic is built into the electrical receptacle means connected to the device and is not a function of hardwiring the device to the junction box. Thus, the electrical receptacle means and the electrical device connected to the electrical receptacle means are configured to be controlled by the original wall switch receptacle and will continue to be so controlled even when the device, with its receptacle means, is moved to another junction box. The same would be the case for lighting fixtures, ceiling fans, and other types of devices where controllability through the wiring system is advantageous. All of the receptacles within the system of the instant invention are movable, and their functionality and the manner in which they are configured necessarily moves with them. All receptacle configurations (i.e., programs) are readily altered or modified. For example, a switch that currently controls only one light easily can be re-configured to control multiple lights in different areas of the house. The same switch is also capable of being moved to a different room in the house. The present system simplifies the rearrangement of electrical receptacles, such as fixtures, switches, and outlets for example, and also permits monitoring and management of those electrical receptacles from any point in the system. In one embodiment, the present system enables monitoring, control, re-configuring, and/ or management of any or all of the electrical receptacles from other electrical receptacles in electrical communication with the system.

In the instant invention, an electrical receptacle combines with an electrical junction box to provide an electrical service port, through which an individual may gain access to electrical service such as by plugging in an electrical toaster or another electrical device. In the instant invention, an electrical receptacle provides the functionality of the electrical service port; an electrical junction box provides the location of the electrical service port; and the series wiring of the electrical junction boxes provides the electrical communication path between and among the electrical service ports and an electrified buss.

The system of the instant invention, without limitation, can include one or more of the following electrical receptacles;

Management unit—This can be, for example, a TV-top unit having remote control capability. The management unit Interfaces with the circuitry via a pass-through interface on a wall outlet faceplate via low voltage cable. This unit can display a listing of all controllable receptacles in the building. It provides an interface for describing, configuring, and/or controlling each electrical receptacle connected to the system. It also recognizes when a new receptacle has been added to the network and asks for user input of relevant information about the new receptacle.

Computer interface—Interfaces with circuitry via a pass-through interface on a wall outlet faceplate via low voltage cable. This interface consists of a computer based software application that can display a listing of all controllable receptacles in the building. It provides an interface for describing, configuring, and controlling each electrical receptacle connected to the system.

Security Interface—This permits a security system to interface with the system's circuitry, optionally via low voltage cable. The security interface allows for monitoring alerts and problems identified in the system. For example, if a stove is left on for an extended period of time, the circuitry and control interface can shut down power to the stove and send an alarm to the security system to notify the building's owner or user.

Automation Interface—This allows a building's automation system to interface with the system's circuitry, optionally via low voltage cable. The automation interface permits the use of triggers to establish or set off a series of events. For example, the automation system could be configured to allow Monitorable Service Outlet—This is a standard service outlet that is may be designed to interface with the improved electrical junction box via the plug-and-play terminal strips and connecting lugs of the junction box. The monitorable service outlet is not necessarily a controllable receptacle, nor is it necessarily in two-way communication with the system's circuitry. However, the monitorable service outlet can interface with a monitoring receptacle to determine, for example, how much power is being consumed through the particular service outlet, or whether the particular service outlet has an amperage draw on it, or what it's temperature is, or any other parameter that would be useful in maintaining the utility or safety of the particular service outlet. Additionally, this service outlet can be configured as a Ground Fault Interrupter ("GFI") service outlet.

Switched Service Outlet—This outlet is designed to interface with the improved electrical junction box via the plug-and-play terminal strips and connecting lugs on the junction box. The switched service outlet interfaces with the circuit, is addressable and controllable by any designated circuit control receptacle, and has full monitoring capabilities. The switched service outlet can be controlled by, for example, a switch, an automation receptacle, a security system, a management unit, or a computer. Additionally, this service outlet can be configured as a GFI service outlet.

Service Switch—This is a standard type service switch that is designed to interface with the improved electrical junction box via the plug-and-play terminal strips and connecting lugs on the junction box. The service switch can interface with the circuit and is addressable, controlling, and controllable from any circuit control receptacle as well as capable of full monitoring by, for example, an automation receptacle, a security system, a management unit, or a computer.

Multi-Control Switch—This is a controlling unit that is designed to interface with the improved electrical junction box via the plug-and-play terminal strips and connecting lugs on the junction box. It also interfaces with the circuit and is addressable, controlling, and controllable from any circuit control receptacle as well as capable of full monitoring by, for example, an automation receptacle, a security system, a management unit, or a computer. The switch can have a push-button type interface or a touch-screen type interface.

Electrical Receptacle Adapter—This is a module that is designed to interface with and adapt electrical receptacles such as, for example, light fixtures and ceiling fans, to the improved electrical junction box via the plug-and-play terminal strips and connecting lugs on the junction box. The electrical receptacle adapter interfaces with the circuit and is addressable and controllable from any circuit control receptacle as well as capable of full monitoring by, for example, a switch, an automation receptacle, a security system, a management unit, or a computer.

Detection Receptacle—A smoke detector or other detection receptacle that is designed to detect the presence of a particular substance or class of substances and to interface with the improved electrical junction box via the plug-and-play terminal strips and connecting lugs on the junction box. Fire alarm circuitry can interface with the system's circuitry for full monitoring and communications capability.

Sensing Receptacle—A temperature, pressure or other sensing receptacle that is designed to quantify the status of an environment and to interface with the improved electrical junction box via the plug-and-play terminal strips and connecting lugs on the junction box. Environmental control circuitry can interface with the system's circuitry for full monitoring and communications capability.

All the above-mentioned receptacles also can be built using the CE bus standard, or adapted to accommodate the LonWorks or LonTalk protocol available from the Echelon Corporation, for communications, in addition to or instead of the circuitry of the instant invention.

Although the present invention has been described with reference to preferred embodiments, including particular materials and size parameters, those skilled in the art will recognize that various modifications and variations to the same can be accomplished without departing from the spirit and scope of the present invention and that such modifications are clearly contemplated herein. No limitation with respect to the specific embodiments disclosed herein is intended nor should any be inferred.

What is claimed is:

1. An electrical system for changeably configuring functionality of electrical service delivered at an electrical service port, said system comprising:

a plurality of electrical junction boxes, wired in series in communication with at least one electrification buss; and at least one electrical receptacle in electrical communication with at least one of said electrical junction boxes, wherein said receptacle comprises a processor for independently changing the functionality of the electrical service delivered at said port.

2. The electrical system of claim 1, wherein said processor is pre-configured for independently changing the functionality of the electrical service delivered at said port.

3. The electrical system of claim 1, wherein said processor is re-configured for independently changing the functionality of the electrical service delivered at said port.

4. The electrical system of claim 1, wherein said processor is re-configured remotely for independently changing the functionality of the electrical service delivered at said port.

5. The electrical system of claim 1, wherein said receptacle, in electrical communication with at least one of said electrical junction boxes, is remotely configured via the electrical wiring in electrical communication with at least one said electrical junction box.

6. The electrical system of claim 1, wherein said receptacle, in electrical communication with at least one of said electrical junction boxes, performs a controlling function.

7. The improved electrical system of claim 1, wherein said receptacle is selected from the group consisting of a management unit, a computer interface, a security interface, an automation interface, a service switch, and a multi-control switch.

8. The electrical system of claim 1, wherein said receptacle, in electrical communication with at least one of said electrical junction boxes, performs a controllable function.

9. The improved electrical system of claim 8, wherein said receptacle is selected from the group consisting of a switched service outlet, a service switch, a multi-control switch, and an electrical receptacle adapter.

10. The electrical system of claim 1, wherein said receptacle, in electrical communication with at least one of said electrical junction boxes, performs a monitorable function.

11. The improved electrical system of claim 10, wherein said receptacle is selected from the group consisting of a monitorable service outlet, a switched service outlet, a service switch, a multi-control switch, an electrical receptacle adapter, a detection receptacle, and a sensing receptacle.

12. The electrical system of claim 1, wherein at least one of said junction boxes comprises:
 a. a housing fastening said at least one of said electrical junction boxes to a building structure;
 b. at least two conductive terminal strips insulatably and securely attached to said housing, wherein each conductive terminal strip conductively terminates an electrical cable, and wherein each of said at least two conductive terminal strips is insulated one from the other;
 c. at least one female connector being electrically insulated to protect an installer, said connector protruding through a security plate, and being in conductive communication with at least one conductive terminal strip matingly and retentively engaging a corresponding male connector; wherein said receptacle comprises at least one male connector conductively connecting said electrical receptacle to said at least one female connector by matingly and retentively engaging said female connector.

13. The improved electrical system of claim 12, wherein said at least two conductive terminal strips each have at least two terminal connecting lugs for conductively terminating an electrical cable, and wherein said at least two terminal connecting lugs are conductively connected in spaced apart relation along said conductive terminal strip.

14. The improved electrical system of claim 12, wherein each of said at least two conductive terminal strips is insulated one from the other by a nonconductive barrier.

15. The improved electrical system of claim 12, wherein said at least one male connector comprises one electrically negative male connector and one electrically positive male connector, and wherein each of said male connectors removably, matingly, and retentively engages a corresponding female connector which conductively communicates with a corresponding conductive terminal strip, and wherein one of said corresponding conductive terminal strips is electrically negative and the other is electrically positive.

16. The improved electrical system of claim 12, wherein said at least one male connector comprises one electrically negative male connector, one electrically positive male connector, and one electrically neutral male connector, and wherein each of said male connectors removably, matingly, and retentively engages a corresponding female connector which conductively communicates with a corresponding conductive terminal strip, and wherein one of said corresponding conductive terminal strips is electrically positive, one is electrically negative, and one is electrically neutral.

17. An electrical system for changeably configuring functionality of electrical service delivered at an electrical service port, said system comprising:
 a plurality of electrical junction boxes, wired in series in communication with at least one electrification buss; and
 at least one electrical receptacle in electrical communication with at least one of said electrical junction boxes, wherein said receptacle comprises a processor for independently changing the functionality of the electrical service delivered at said port,
 wherein at least two of said electrical junction boxes, wired in series in communication with at least one electrification buss, terminates at least one set of low voltage cables for monitoring and/or controlling at least one of said electrical junction boxes.

18. The improved electrical system of claim 17, further comprising a set of low voltage cables, wherein said low voltage cables connect said electrical junction boxes in series to form an electrical communication path.

19. The improved electrical system of claim 17, wherein said housing is partitioned by a non-conductive, low voltage barrier to separate said at least one set of low voltage cables from other components of said at least one of said electrical junction boxes.

20. The improved electrical system of claim 17, further comprising a low voltage connector block attached to said housing and adapted to terminate said at least one set of low voltage cables.

21. The electrical system of claim 20, wherein said low voltage connector block, attached to said housing and terminating said at least one set of low voltage cables, further receives a control/monitor pigtail from a electrical receptacle mounted on and electrically connected to said at least one of said electrical junction boxes.

22. The electrical system of claim 17, wherein at least two of said electrical junction boxes each terminates at least two sets of low voltage cable.

23. The improved electrical system of claim 22, wherein said at least two sets of low voltage cable comprise a first set of low voltage cables for communicating data and information to said low voltage connector block and a second set of low voltage cables for controlling and monitoring at least one electrical receptacle conductively connected to said junction box.

24. The electrical system of claim 12, wherein said barrier comprises a security plate, having at least one aperture substantially corresponding to said at least one female connector, removably attached within said housing such that said security plate substantially encloses said at least two conductive terminal strips and said at least one female connector within said housing.

25. The improved electrical system of claim 24, wherein said security plate further comprises at least one aperture substantially corresponding to at least one aperture on a low voltage connector block that is adapted to receive a control/monitor pigtail, and wherein said security plate encloses said low voltage connector block within said housing and permits said control/monitor pigtail to removably and matingly engage said low voltage connector block through said security plate.

26. A method of providing an electrification system, having a number of electrical service ports, for a structure comprising the steps of:
 a. providing a plurality of electrical junction boxes electrically wired in series to an electrification buss;

b. placing an electrical receptacle, having a processor, in at least one of said electrical junction boxes to form an electrical service port; and, c. configuring said processor to perform a desired functionality which determines the functionality of said port.

27. The method of providing an electrification system of claim 26, wherein said processor is pre-configured for independently configuring the functionality of the electrical service delivered at said port.

28. The method of providing an electrification system of claim 26, wherein said processor is re-configured for independently configuring the functionality of the electrical service delivered at said port.

29. The method of providing an electrification system of claim 26, wherein said processor is re-configured remotely for independently configuring the functionality of the electrical service delivered at said port.

30. The method of providing an electrification system of claim 26, wherein said receptacle re-configures a re-configurable receptacle that is in electrical communication with at least one said electrical junction box.

31. The method of providing an electrification system of claim 26, wherein said receptacle, in electrical communication with at least one of said electrical junction boxes, performs a controlling function.

32. The method of providing an electrification system of claim 31, wherein said receptacle is selected from the group consisting of a management unit, a computer interface, a security interface, an automation interface, a service switch, and a multi-control switch.

33. The method of providing an electrification system of claim 26, wherein said receptacle, in electrical communication with at least one of said electrical junction boxes, performs a controllable function.

34. The method of providing an electrification system of claim 33, wherein said receptacle is selected from the group consisting of a switched service outlet, a service switch, a multi-control switch, and an electrical receptacle adapter.

35. The method of providing an electrification system of claim 26, wherein said receptacle, in electrical communication with at least one of said electrical junction boxes, performs a monitorable function.

36. The method of providing an electrification system of claim 35, wherein said receptacle is selected from the group consisting of a monitorable service outlet, a switched service outlet, a service switch, a multi-control switch, an electrical receptacle adapter, a detection receptacle, and a sensing receptacle.

37. The method of providing an electrification system of claim 26, further comprising the steps of providing at least one set of low voltage cables electrically communicating with at least two of said plurality of electrical junction boxes to form an electrical communication path.

* * * * *